US007770782B2

(12) United States Patent
Sahud

(10) Patent No.: US 7,770,782 B2
(45) Date of Patent: Aug. 10, 2010

(54) METHOD AND SYSTEM TO MONITOR HAND HYGIENE COMPLIANCE

(75) Inventor: Andrew Graham Sahud, Pittsburgh, PA (US)

(73) Assignee: Allegheny-Singer Research Institute, Pittsburgh, PA (US)

( * ) Notice: Subject to any disclaimer, the term of this patent is extended or adjusted under 35 U.S.C. 154(b) by 931 days.

(21) Appl. No.: 11/581,124

(22) Filed: Oct. 13, 2006

(65) Prior Publication Data

US 2008/0087719 A1 Apr. 17, 2008

(51) Int. Cl.
*G06F 17/00* (2006.01)
*G08B 23/00* (2006.01)

(52) U.S. Cl. .................................... 235/375; 340/573.1

(58) Field of Classification Search ................. 235/375; 340/573.1

See application file for complete search history.

(56) References Cited

U.S. PATENT DOCUMENTS 5,610,589 A * 3/1997 Evans et al. .............. 340/573.1
5,945,910 A * 8/1999 Gorra ...................... 340/573.1
6,727,818 B1 * 4/2004 Wildman et al. .......... 340/573.1
7,375,640 B1 * 5/2008 Plost ........................ 340/573.1
7,659,824 B2 * 2/2010 Prodanovich et al. .... 340/573.1

* cited by examiner

*Primary Examiner*—Jamara A Franklin
(74) *Attorney, Agent, or Firm*—Pepper Hamilton LLP

(57) ABSTRACT

A system which allows healthcare providers to monitor hand hygiene compliance includes a data reader adapted to be worn by a healthcare provider. The system includes a portal trigger disposed at each door portal of a patient room which activates the reader to record an entrance event when the provider enters the patient room. The system includes a dispenser trigger disposed at each cleaning dispenser having cleanser in or at the entrance of each patient room which activates the reader to record a dispensing event when the provider causes the dispenser to dispense cleanser, the reader having a display which displays a number of dispensing events and a number of entrance events. A method which allows healthcare providers to monitor hand hygiene compliance. A system which allows a person to monitor hand hygiene compliance. A method for allowing a person to monitor hand hygiene compliance.

33 Claims, 4 Drawing Sheets

METHOD AND SYSTEM TO MONITOR HAND HYGIENE COMPLIANCE

FIELD OF THE INVENTION

The present invention is related to monitoring hand hygiene compliance. More specifically, the present invention is related to monitoring hand hygiene compliance using triggers to record entrance and dispensing events.

BACKGROUND OF THE INVENTION

Hospital infections and related complications are a tremendous burden to the patient, the physician, and the healthcare system. Many initiatives have been implemented to combat these problems and yet, ultimately, hand hygiene is still the single most effective means of spreading infection. It is estimated that 35-40% of healthcare providers are compliant with accepted hand hygiene protocols.

A tool for tracking hand washing which is simple, easily to adopt, inconspicuous, and which can provide real time feedback is needed.

BRIEF SUMMARY OF THE INVENTION

The present invention pertains to a system which allows healthcare providers to monitor hand hygiene compliance. The system comprises a data reader adapted to be worn by a healthcare provider. The system comprises a portal trigger disposed at each door portal of a patient room which activates the reader to record an entrance event when the provider enters the patient room. The system comprises a dispenser trigger disposed at each cleaning dispenser having cleanser in or at the entrance of each patient room which activates the reader to record a dispensing event when the provider causes the dispenser to dispense cleanser, the reader having a display which displays a number of dispensing events and a number of entrance events.

The present invention pertains to a method for allowing healthcare providers to monitor hand hygiene compliance. The method comprises the steps of activating a data reader adapted to be worn by a healthcare provider by a portal trigger 14 disposed at each door portal of a patient room and recording an entrance event when the provider enters the patient room. There is the step of activating the reader by a dispenser trigger disposed at each cleaning dispenser having cleanser at the entrance of each patient room and recording a dispensing event when the provider causes the dispenser to dispense cleanser. There is the step of displaying a number of dispensing events and a number of entrance events on a display of the reader.

The present invention pertains to a system which allows a person to monitor hand hygiene compliance. The system comprises a data reader adapted to be worn by the person. The system comprises a portal trigger disposed at each door portal of a bathroom which activates the reader to record an entrance event when the provider enters the bathroom. The system comprises a dispenser trigger disposed at each cleaning dispenser having cleanser in the bathroom which activates the reader to record a dispensing event when the provider causes the dispenser to dispense cleanser. The reader having a display which displays a number of dispensing events and a number of entrance events.

The present invention pertains to a method for allowing a person to monitor hand hygiene compliance. The method comprises the steps of activating a data reader worn by the person by a portal trigger disposed at each door portal of a bathroom and recording an entrance event when the person enters the bathroom. There is the step of activating the reader by a dispenser trigger disposed at each cleaning dispenser having cleanser in the bathroom and recording a dispensing event when the person causes the dispenser to dispense cleanser. There is the step of displaying a number of dispensing events and a number of entrance events on a display of the reader.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 5:
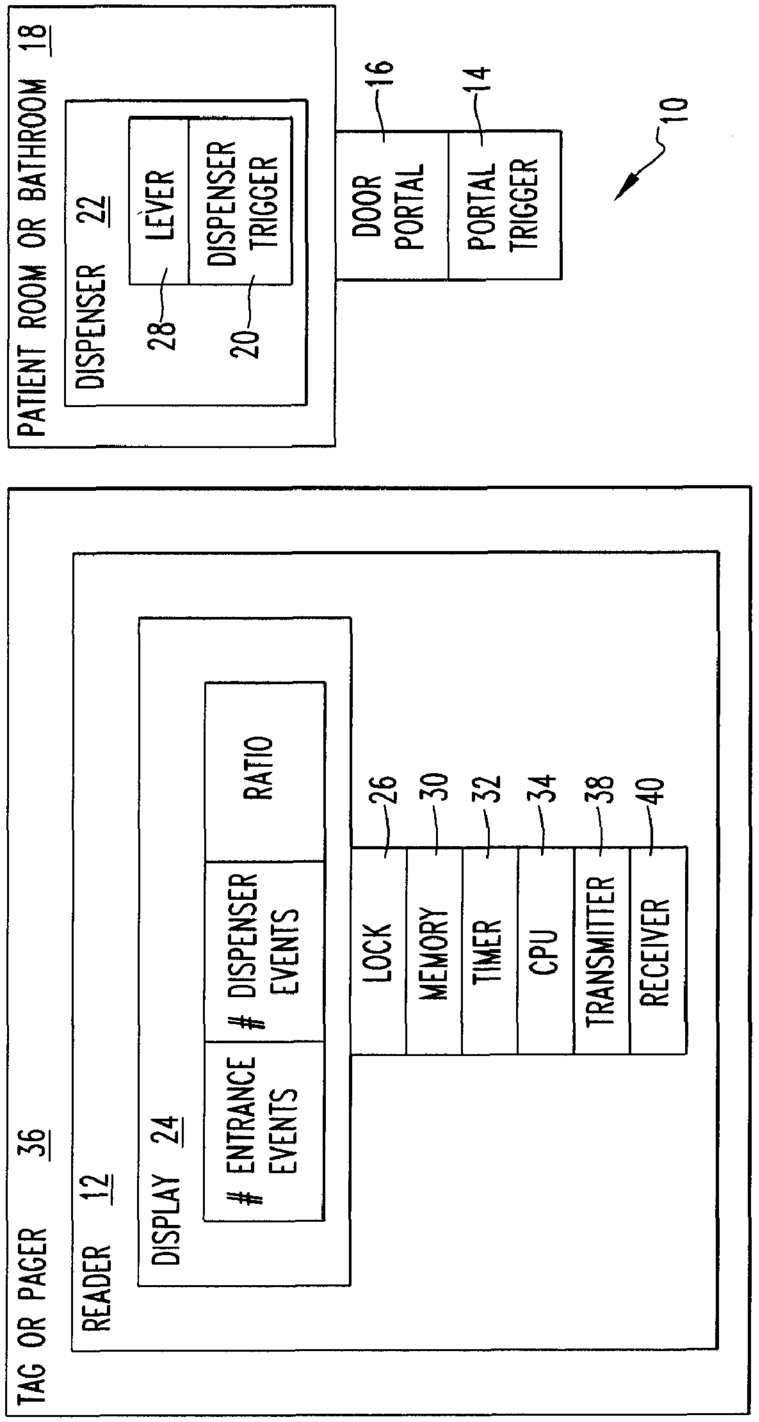
FIG. 5 is a block diagram of the system of the present invention.

Referring now to the drawings wherein like reference numerals refer to similar or identical parts throughout the several views, and more specifically to FIG. 5 thereof, there is shown a system 10 which allows healthcare providers to monitor hand hygiene compliance. The system 10 comprises a data reader 12 adapted to be worn by a healthcare provider. The system 10 comprises a portal trigger 14 disposed at each door portal 16 of a patient room 18 which activates the reader 12 to record an entrance event when the provider enters the patient room 18. The system 10 comprises a dispenser trigger 20 disposed at each cleaning dispenser 22 having cleanser in or at the entrance of each patient room 18 which activates the reader 12 to record a dispensing event when the provider causes the dispenser to dispense cleanser, the reader 12 having a display 24 which displays a number of dispensing events and a number of entrance events.

Preferably, the display 24 displays a ratio of the number of dispensing events and the number of entrance events. The display 24 preferably displays the ratio, the number of entrance events, and the number of dispensing events simultaneously. Preferably, the reader 12 includes a lock 26 which is controlled by the provider to control access to the number of dispensing events, the number of entrance events and the ratio recorded by the reader 12. The dispenser preferably includes a lever 28 to which the dispenser trigger 20 is engaged.

The lock can be similar to password controller access that needs to be entered to the reader to allow access to the reader by the provider, similar to what is available by the Windows operating system.

Preferably, the reader 12 resets the number of dispensing events, the number of entrance events and the ratio to zero after a predetermined time. The reader 12 preferably includes a memory 30 which stores the number of dispensing events, the number of entrance events and the ratio. Preferably, the reader 12 includes a timer 32. The reader 12 preferably includes a CPU 34.

Preferably, the reader 12 is part of a tag or a pager 36. The triggers preferably have a transmitter 38 and a receiver 40.

Preferably, the reader 12 has a transmitter 38 and a receiver 40. The memory 30 preferably can be externally electronically interrogated. Preferably, an entrance event only occurs when the reader 12 enters the patient room 18. There preferably can only be at most two dispensing events associated with one entrance event. Preferably, the reader 12 has an enabled state entered when either an entrance event or a dispensing event occurs, an activated state entered when the reader 12 is in the enabled state and an entrance event or a dispensing event occurs, and a finalized state entered when the reader 12 is in an activated state and a dispensing event occurs.

The dispenser trigger 20 preferably has an enabled position and an activated position; the enabled position on the dispenser trigger 20 is entered into as a result of, and dependent upon, the reader 12 entering the enabled state; the activated position on the dispenser trigger 20 is subsequently arrived at when a dispensing event occurs with the dispenser. Preferably, the system 10 includes an additional data reader 12 adapted to be worn by an additional healthcare provider and wherein each reader 12 only records a dispensing event associated with the provider having the corresponding reader 12. The dispenser preferably transmits a key each time the dispenser has a dispensing event associated with the reader 12 of the provider initiating the dispensing event. The reader 12 and the triggers can use RFID to communicate with each other. Alternatively, the reader 12 and the triggers can use Bluetooth technology or other wireless technologies to communicate with each other.

The present invention pertains to a method for allowing healthcare providers to monitor hand hygiene compliance. The method comprises the steps of activating a data reader 12 adapted to be worn by a healthcare provider by a portal trigger 14 disposed at each door portal 16 of a patient room 18 and recording an entrance event when the provider enters the patient room 18. There is the step of activating the reader 12 by a dispenser trigger 20 disposed at each cleaning dispenser 22 having cleanser at the entrance of each patient room 18 and recording a dispensing event when the provider causes the dispenser to dispense cleanser. There is the step of displaying a number of dispensing events and a number of entrance events on a display 24 of the reader 12.

Preferably, the displaying step includes the step of displaying on the display 24 a ratio of the number of dispensing events and the number of entrance events. The displaying step preferably includes the step of displaying the ratio, the number of entrance events, and the number of dispensing event simultaneously.

Preferably, there is the step of controlling a lock of the reader 12 by the provider to control access to the number of dispensing events, the number of entrance events and the ratio recorded by the reader 12. There is preferably the step of resetting the number of dispensing events, the number of entrance events and the ratio to zero after a predetermined time.

Preferably, there is the step of interrogating electronically the memory 30 externally. There are preferably the steps of entering the reader 12 into an enabled state when either an entrance event or a dispensing event occurs, entering the reader 12 into an activated state when the reader 12 is in the enabled state and an entrance event or a dispensing event occurs, and entering the reader 12 into a finalized state when the reader 12 is in an activated state and a dispensing event occurs. Preferably, there is the step of entering the dispenser trigger 20 into an enabled position as a result of, and dependent upon, the reader 12 entering the enabled state; and entering the dispenser trigger 20 into the activated position when a dispensing event occurs with the dispenser. There is preferably the step of transmitting by the dispenser trigger 20 a key each time the dispenser has a dispensing event associated with the reader 12 of the provider initiating dispensing event.

The operation of the preferred embodiment is now described.

Index of Terms:

Reader 12: An electronic CPU 34 within the system 10 that records room entries, and associated hand washing events. Also has within it an electronic lock A (detailed below) and has the ability to signal to Locks B and C such that these other locks enter into the enabled position.

Lock A: Exists within the Reader 12 in a closed state or open state. The open state can operate in enabled, (enabled-α), activated, finalized positions.

- Enabled: state of a lock after one initial signal from an electronic key
- Enabled-α: State of a lock which exhibits the potential to become fully enabled but indicates washing behavior out of sequence from the basic model.
- Activated: State of a lock after a second signal has been received from an electronic key
- Finalized: State of a lock once a third signal has been received by an electronic key and acts by closing the circuit.

Locks B and C: Virtual or electronic lock systems embedded within the soap dispenser and alcohol gel wash dispensers which can run in closed state or open state. Open state consists of being in the enabled position, the activated positions, and then advancing to the “closed out” position by means of electronic key mechanisms triggered by actions detailed below.

Autonomous Circuits: An electronic circuit tracked by the Reader 12 of one individual which utilizes a unique key set (electronically generated codes) with preserved functionality for one user. Such a circuit allows one to independently advance through the process of washing their hands before and after a patient room 18 entry but specifically keeping track of their personal behavior irrespective of others who may have entered into the room at the same time.

Keys: Signals generated within the room entry circuit which can act to advance locks into different positions (states of engagement). Dispensing soap or alcohol gel wash and entering a patient room 18 by crossing the doorway threshold are means of generating different signals or Keys. As keys are generated they serve as signals acting between the locks in the system 10. Each individual is provided a unique but temporary key which tracks his/her specific activity regardless of and independent of the behavior of other healthcare providers who have entered the room.

Wireless Communication: A means of communicating to the Reader 12 adapted to be worn by an individual tracking his/her hand hygiene behavior. This is accomplished by way of the delineated virtual electronic lock and key system with use of Radio Frequency Identification technology, magnetic couplers, Blue tooth technology or other. The system is designed and engineered in such a way that the a circuit opens when one begins an action recognized as a possible option for initiating a hand hygiene/room entry circuit.

The system 10 is a device that will be designed with two parts (utilizing either Radio Frequency Identification technology, Bluetooth technology, or other system). First, a data reader (ideally approximately 3 cm wide/1 cm in height, 5 mm in depth) would be discreetly worn or attached to a hospital employee's pager or identification tag which communicates with a second component, a data trigger. The trigger will be affixed within a room and attached to a soap or alcohol gel wash dispenser. These "triggers" would be placed at the door portal sites (activated by physically crossing the door threshold) and within the lever mechanism of the soap/alcohol gel wash dispensers (activated by depressing the dispensing devices). A complete circuit would involve two hand washing events coupled with one room entry for patient encounters. This ratio would reflect optimal behavior in this setting, i.e. one washing before and after each patient encounter. The ratio could be modified for use in different settings. For example, in the food service industry, a complete circuit would amount to one washing after each bathroom entry.

The reader device would include a small LCD display (or other) which would have three columns indicating 1) Total Washes 2) Total Room Entries 3) Ratio (2:1 or other). The user would have the ability to visually inspect the device at any time during the day to check his/her progress. Automatic device resetting at a predetermined time, such as midnight, would give the health care provider the opportunity to change his/her behavior. The goal of such a device would be to empower the user much in the way a pedometer can be used as a tracker and serve as an incentive to increase/change behavior. The person using the device would have the option of having the device electronically interrogated at specified intervals. Stored data could be accessed and reported confidentially to the user. Users could voluntarily disclose their readers 12 for external evaluation. Superlative behavior could be rewarded with incentives. The overall objective would be to improve hand washing compliance, provide real time feedback to the wearer, empower staff, and ultimately prevent infections and save lives. This would be done without requiring extensive computer programming, eliminating software engineering, and obviate the need for electrical hardwiring in patient rooms. The device acts as a simple counter, displaying the raw data for the user. Moreover, rather than create a model of external surveillance which is often perceived as threatening, such a system would avoid establishing an adversarial relationship between those collecting the data and the employee/staff member. In a sense, the person using the system 10 owns their own data and behavior.

This technology can be utilized primarily for work disciplines where hand hygiene compliance is critical. This would encompass venues such as a hospital, clinic, or medical office, but also within the restaurant and food handling industries, and potentially as an application in industries such as with computer processor manufacture where germ free conditions are often essential for the production process.

The system 10 is unique because it provides real-time feedback to the employee regarding their hand hygiene practices. The raw data is available for visual inspection at any time during the day and a calculated ratio displays or grades their performance. Such feedback has been shown to effectively influence practices positively facilitating behavioral modification. The device does not require an extensive network of electronics and wiring, does not require complex software for analysis, does not provide the user with unnecessary information, and makes users more accountable for their behavior. The device can be electronically interrogated much in the way a pacemaker can be checked for unusual activity/alarms between doctor visits. The information can be collected and disseminated to reflect the behavior of the collective performance of a group of workers. Data can be displayed or communicated to workers as an additional mechanism of anonymous feedback. For example, data could be displayed to all portraying hand hygiene behavior of all physicians in a hospital or for all nursing staff. Individuals would have the option of voluntarily disclosing their personal data to their employer as a part of job performance evaluation in conjunction with incentives such as for job promotion, bonus, discounts etc.

EXAMPLE

Doctor Andrew walks up to a patient room 18. He presses the lever 28 on the alcohol gel hand hygiene dispenser which is located on the wall adjacent to the patient room 18. This action serves to take Lock A from "closed" position to "open" positions. Specifically it acts to place Lock A into the "enable" position. Lock A is an electronic lock which is part of the Reader 12 which Doctor Andrew is wearing. Lock A has three open positions "enabled", "activated" and "finalized". Enabling requires an initial action by a first electronic key, and activation requires the action of a second electronic key. So, to review, the act of dispensing the hand sanitizer by depressing the lever 28, serves to "turn the first key" which in turn sends a signal back to the Reader 12 which Doctor Andrew is wearing, and places Lock A in the enabled position. The reader 12 then remains in the enabled position for a predetermined period by means of a timer 32 mechanism. If Doctor Andrew does not enter a patient room 18, Lock A on the reader 12, automatically deactivates to the "closed position" and does not record a circuit. A circuit consists of an initial hand washing event, a subsequent patient room 18 entry (within five minutes of an initial wash), a final washing, and exit from the patient room 18 (or an acceptable variant on this theme i.e. entering a patient room 18 first, washing hands within the room, examining the patient, and washing as on exits the room using the alcohol gel wash dispenser on the wall). An incomplete circuit implies a room entry with either no washing before and after, a room entry with washing beforehand alone, or a room entry with washing done after the examining the patient.

Moving on in the description above . . . as Dr. Andrew walks into the room (crossing the doorway threshold) this action allows the second key to activate lock A on his Reader 12. Walking across the doorway threshold which is the same as activating the second key for lock A can be accomplished by passive RFID coupling or other means. Once lock A on the reader 12 adapted to be worn by Dr. Andrew is activated, the Reader 12 then generates a signal (key 3) which is electronically coupled with Locks B and C. Lock B is placed within the alcohol gel wash dispenser just outside or just within the room and Lock C is placed within the soap dispenser universally placed within the patient's room. The signal sent from the Reader 12 adapted to be worn by Dr. Andrew is in effect turning key 3 and thereby enabling Locks B and C.

At this time, the Reader 12 Doctor Andrew is wearing has lock A in the activated position, and locks B and C (within the room environment) are in the enabled positions. Locks B and C remain enabled until timing out or being moved to activated position.

Moving on, Doctor Andrew examines the patient. Once completing this action he proceeds either to a) wash his hands with soap and water (at the sink in the room), b) wash his hands by dispensing the alcohol gel wash device just outside or near the entrance to the patient's room, or c) leaves the room without washing his hands.

If Dr. Andrew washes his hands at the sink, he accesses the liquid soap by depressing the lever 28 on the dispenser. This action signals back to his Reader 12 and causes a signal to finalize lock A. This signal constitutes key 4. Once key 4 places lock A on the Reader 12 into the finalized position, the circuit is closed and complete. The system 10 (with its embedded Reader 12) adapted to be worn by Dr. Andrew will read "1 entry, 2 washes, ratio 2:1". If Dr. Andrew were to finish examining the patient in the scenario above, avoid the sink and soap dispenser in the room, and walk towards the doorway, he can dispense alcohol gel wash at this location. This action will serve as an alternate means of causing key 4 to signal back to the Reader 12 adapted to be worn by Dr. Andrew and also serve to finalize lock A. As noted above, if this alternate pathway occurs, lock A is considered a closed and completed circuit. The system 10 again would display "1 entry, 2 washes, ratio 2:1". Action performed at the liquid soap dispenser or the alcohol gel wash dispenser independently close out the circuit preventing the reader 12 from recording two washes at the end of the patient encounter and thereby recording erroneous or inflated values.

If Dr. Andrew leaves the room after the patient encounter but does not wash his hands (either at the sink in the room with liquid soap or by using the alcohol gel wash dispenser just outside or at the entrance to the patient room 18) he leaves with lock A on his Reader 12 in the activated position. Additionally, locks B and C (within the soap and gel wash dispensers respectively) remain held in the enabled positions. As Dr. Andrew leaves the room and crosses the doorway threshold locks A, B, and C close out after their respective timer 32 mechanisms clock out. His system 10 would record "1 entry, 1 wash, ratio 1:1".

If Dr. Andrew enters the room without washing his hands with the alcohol gel dispenser, key 2 acts to signal to the Reader 12 that a room entry has occurred. Lock A is placed into an open position given the designation enabled-α position. Enabled-α position indicates a circuit in which the Doctor goes through approved behavior in a different order. As such when Dr. Andrew enters the room and washes his hands at the sink, dispensing liquid soap, his Lock A will simultaneously detect the recorded room entry, which also had placed lock 2 in an enabled-α position and coupled with the hand washing event will cause his Lock A to go from enabled state to activated state at once. Stated differently, once Dr. Andrew's reader 12 acknowledges the room entry and dispensing of soap, his Lock A will automatically switch to the recognized activated position illustrated in the example above which proceeds in normal sequence. Once his lock A is activated this serves to enable Locks B and C. Locks B and C, as delineated above, are within the soap dispenser and the alcohol gel wash dispenser. These locks remain in the enabled position until Dr. Andrew completes his exam of the patient and washes his hands at either station. Either of these actions will close the circuit.

If several Doctors entered into a room after one another, their entries and washing events would be tracked independently of one another in the form of separate autonomous circuits created by the same actions noted above. As each circuit is initiated, the hand washing dispensing device would cycle through to the next electronic key (or digital code) thereby initiating another unique and user specific series of electronic locks and keys. The subsequent lock and key pathways would allow many providers to enter a room and for each to be scored on his own behavior and actions regardless (and without interfering with the actions of others).

Example, if Doctor Andrew walks up to the outside of a patient room 18 and depresses the alcohol gel wash, the Lock A on his person becomes enabled by key 001-1. Doctor Hannah walks behind Dr. Andrew. She dispenses alcohol gel wash after him. When she does this, the dispenser cycles through another key. Instead of key 001-1 which becomes the temporary key being used by Dr. Andrew (in this room entry/washing circuit), she is given Key 002-1. Another person entering the room could receive Key 003-1, for example. Other Doctors or people entering would dispense the device and be given other keys, independently activated and setting into sequence their own circuit. In order for this to occur the keys could in principle reflect a sequentially or randomly generated numeric code.

In order to understand how concurrent circuits can exist, we can continue the example of Dr. Andrew entering the patient room 18 after dispensing alcohol gel wash, thereby enabling Lock A on his reader 12 with Key 001. Dr. Hannah follows suit, dispensing gel wash, which causes the alcohol gel wash dispenser to enable her Lock A with a different key generated by pressing the lever 28. We'll call this Key 002 as listed above. Note, each time the lever 28 is depressed a new key is initiated while locking out for 3-5 seconds before the next user depresses the device. In this way, double pumping for additional washing gel/soap would not generate additional key "signals". While entering the room to examine the patient, Dr. Andrew's Reader 12 goes from enabled to activated as he crosses the door threshold (by triggering key 001-2). Dr. Hannah then crosses the doorway threshold. As she does this, her Reader 12 with its lock A, also goes from enabled to activated positions in the same way (with the triggering of a second key which occurs while crossing the doorway threshold). As Dr. Andrew proceeds to examine the patient with Dr. Hannah, both of their Lock A's on their respective Readers remain in the activated positions, locks B and C within the soap dispenser and alcohol gel wash respectively (as delineated above) remain in enabled positions. More specifically, Locks B and C are capable of listing simultaneous sublock states. Sublocks are activated by the behavior of each individual who has entered the room. In this instance Dr. Andrew's actions have created an autonomous circuit independent of Dr. Hannah. If inspected, locks B and C would exhibit an two enabled sub-locks serving to track the two Doctors. If another person entered the room after washing with the alcohol gel dispenser, locks B and C would then register a third enabled sublock. Returning to the case of Dr. Andrew and Dr. Hannah, when finishing examining the patient Dr. Andrew chooses to wash his hands at the sink. This action serves to finalize Lock A on his personal reader 12 and closes his circuit. Dr. Hannah chooses to wash her hands using the alcohol gel wash dispenser just at the entrance to the room. This action triggers her Lock A to enter the finalized position thereby completing her circuit.

The system 10 is portable. It allows the user to wear the device and inspect it to provide themselves with feedback thereby encouraging change in behavior. The device is designed to reset its values once daily to zero. Each day would begin with a new goal of improving hand hygiene compliance. The system 10 would be capable of undergoing electronic interrogation. Either via electromagnetic means or direct port (such as USB) the data could be downloaded for the user to see and inspect his behavior trends. The system 10 is intended to be portable such that while ideally all healthcare providers would wear the device, if a limited number are available, they can be worn by different groups of providers at different times. For example, all Nurses could be given systems 10 or all Nurses on a specific ward could be given systems 10. This can occur for a specified period of time. While the devices are worn and in use, the users can inspect their devices throughout the day intermittently. With interrogation of the device, the summary data can be provided to the individual user. All of the devices could be collected and the cumulative data could be downloaded and used as a tool to teach those in the group by exhibiting anonymous cumulative group values. The system 10 would allow for an individual to voluntarily reveal their identity as a means of rewarding superlative behavior.

Figure 1:
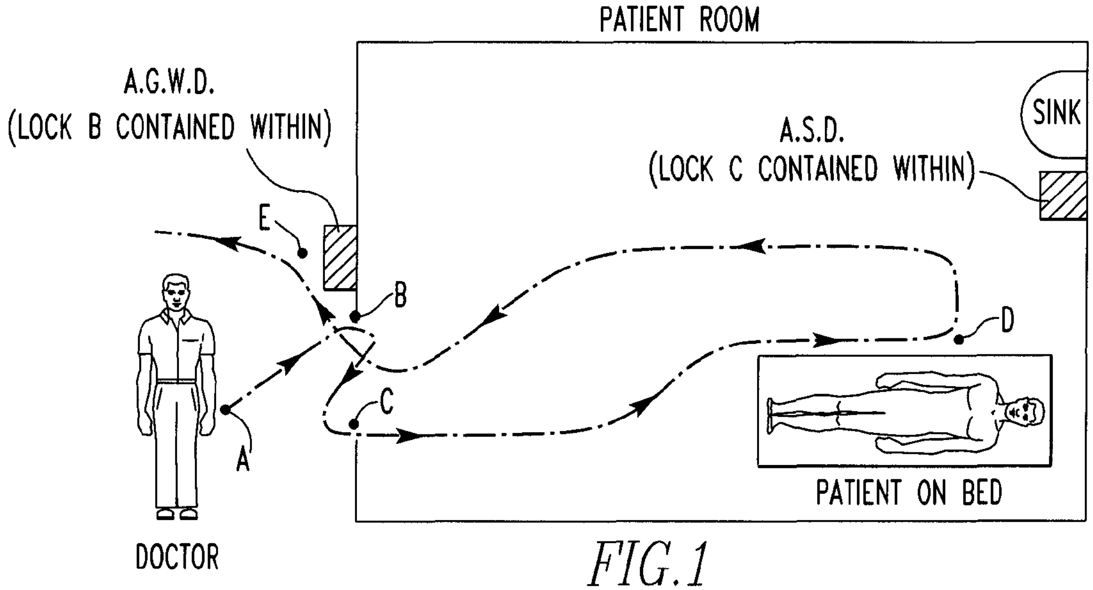
FIG. 1 is a schematic diagram of the system of the present invention.

Referring to FIG. 1:

a) Standing outside patient room 18, wearing system 10 with embedded reader 12 carrying electronic Lock A;

b) Doctor approaches Alcohol Gel Wash Dispenser (A.G.W.D.) outside patient room 18. He dispenses A.G.W.D. This action (Key 1) serves to place Lock A into the enable position;

c) Doctor enters patient's room. By crossing the doorway threshold, this action via key 2 causes Lock A into the activated position. This, in turn, causes Lock A to signal to Locks B and C (via Key 3). Locks B and C are thereby placed in the enabled position;

d) Doctor examines patient;

e) Doctor leaves patient, walks through door threshold. He washes his hands by dispensing alcohol gel wash. This action (Key 4) serves to complete the circuit.

f) Doctor's system 10 is inspected and shows, Washings 2, Entries 1, Ratio 2:1

Figure 2:
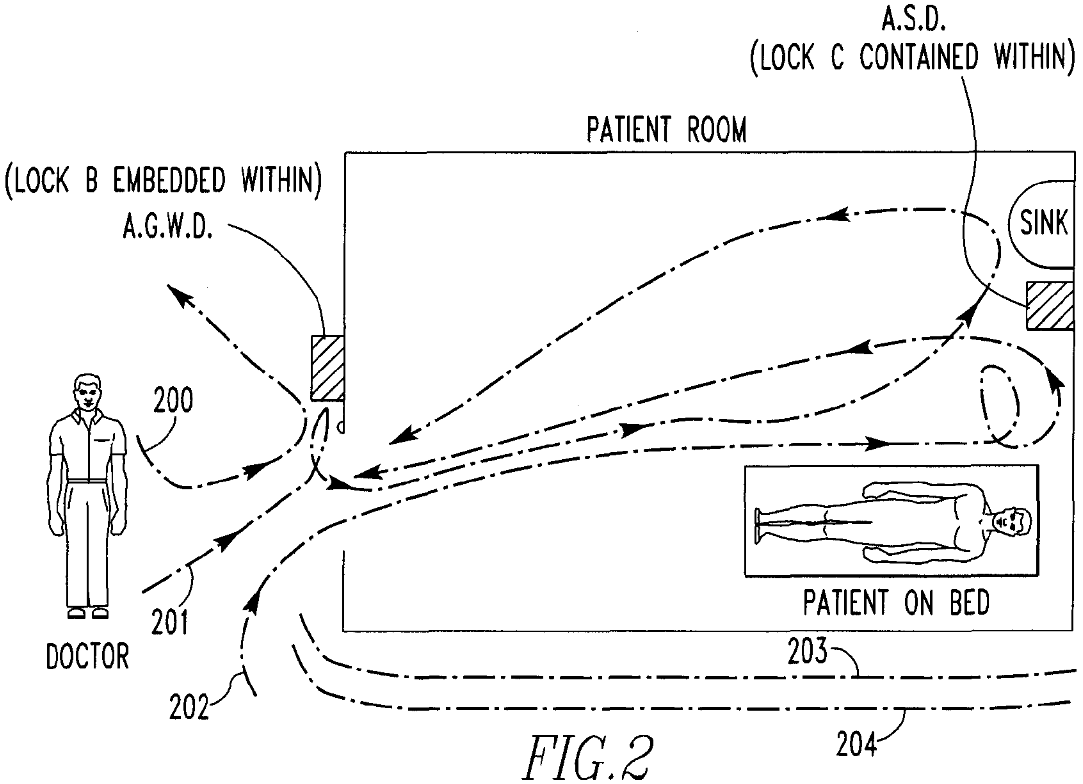
FIG. 2 is a schematic diagram of the system of the present invention.
Figure 3:
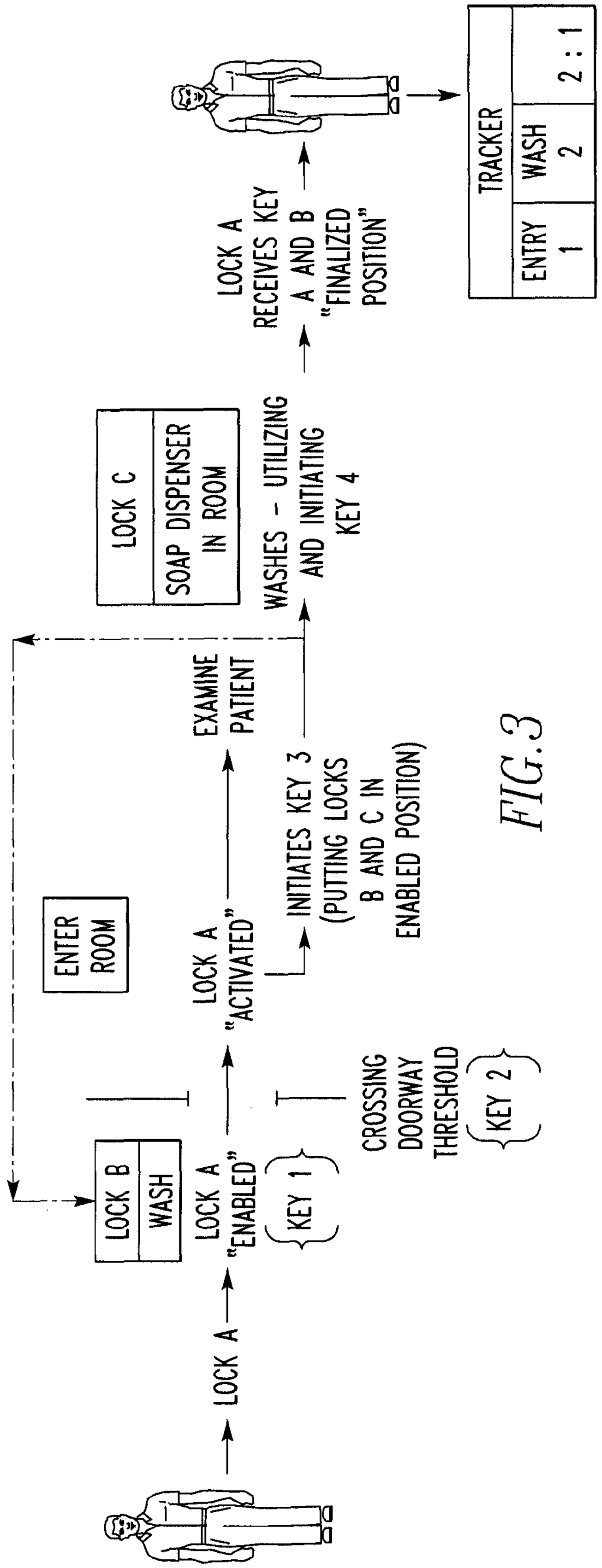
FIG. 3 is a schematic diagram of the system of the present invention with respect to keys.

Referring to FIG. 2:

Path 200; washes, approaches room but never enters. Lock A is enabled, times out-no activity recorded;

Path 201; washes outside room. Lock A enabled. Crosses threshold of door. Lock A activated, enabling Locks B and C. Examines patient. Washes hands at sink in room. Activates Lock C thereby "finalizing" Lock A and closing a circuit.

Path 202; Enters room without washing. Crossing threshold enables Key 2 to place Lock A in an enabled-α setting indicating behavior deviating from ideal order. Crossing threshold registers 1 room entry. Walks to Antibacterial Soap Dispenser (A.S.D.) to wash hands before examining patient. This action retroactively causes Lock A to enter position enabled and immediately then enter position activated. Lock A then signals to Locks B and C, placing them in enabled position. After examining the patient, Doctor returns to A.S.D. and washes. This action puts Lock A into finalized position and closes the circuit.

Paths 203 and 204; Dr. A washes at A.G.W.D. Lock A on his reader 12 enters enabled state. Dr. B follows, washing hands at A.G.W.D. Drs. A and B enter the room. Both their Locks are now activated. Their Lock A's were activated by unique electronic keys. These keys were generated with the use of A.G.W.D. Each Doctor enters within his own circuit. Locks for each person causes the enabling of Locks B and C.

Possible Circuits

Approach Alcohol Gel Wash→dispense→leave, no room entry occurs

Approach Alcohol Gel Wash→dispense→enter→examine patient
- (a) Soap dispenser
- (b) Alcohol Gel Wash
- (c) Leave room without washing
- (d) Soap dispenser+Alcohol Gel Wash Enter room→soap dispenser→examine patient
- (a) Soap dispenser
- (b) Alcohol Gel Wash
- (c) Leave room without washing
- (d) Soap dispenser+Alcohol Gel Wash Enter room→examine patient
- (a) Soap dispenser
- (b) Alcohol Gel Wash
- (c) Leave room without washing
- Soap dispenser+Alcohol Gel Wash Enter room→DO NOT examine patient
- (a) Leave room without washing
- (b) Alcohol Gel Wash
- (c) Soap dispenser
- (d) Soap and Alcohol Gel Wash dispenser Approach Alcohol Gel Wash→DO NOT examine patient
- (a) Leave room without washing
- (b) Alcohol gel wash
- (c) Soap dispenser
- (d) Soap dispenser and Alcohol Gel Wash Enter room→soap dispenser→DO NOT examine patient
- (a) Leave room without washing
- (b) Alcohol gel wash
- (d) Soap dispenser
- (e) Soap dispenser and Alcohol Gel Wash The dispenser would determine which provider is using the dispenser in the following way. The dispenser, once used, would send out a quick scouting signal to the provider standing within closest proximity (i.e. approx. 2 feet) from the device. This serves to acknowledge the identity/electronic key associated with the user. The dispenser would then receive this data and immediately issue the matching specific electronic key. Recalling that any key maintained in the "enabled" dispenser resulted from an electronically forwarded cascade which began when the key was first issued to the provider.

(Each key issued to a provider at the onset of the circuit results in the forwarding of a unique signal to enable the dispenser. Hence, there is a specific enabled "sub-state" at each dispenser for each provider who has entered the room and has been issued an electronic key. The dispenser could therefore potentially have many enabled "sub-states" with the associated specific electronic keys of each provider.)

Now that the provider's reader 12 has received this matching key, the dispenser would remain closed out for this specific provider. However, if other providers are in the room, the dispensers will carry other enabled sub-states (as many substates as there are people in the room).

When the next provider uses the dispenser, he would depress the lever 28, and just as in the scenario delineated above, a quick scouting signal would be issued out from the dispenser and received only by the individual in closest proximity (2-3 ft.) identifying the provider by matching his key with the electronic keys remaining in the enabled position within the dispenser, and then sending out a signal specific to his key match. Once his reader 12 receives the key, his reader 12 will advance to a finalized state.

The system 10 can also be retrofitted to track employee hand washing behavior after using bathroom.

The present invention pertains to a system 10 which allows a person to monitor hand hygiene compliance. The system 10 comprises a data reader 12 adapted to be worn by the person. The system 10 comprises a portal trigger 14 disposed at each door portal 16 of a bathroom which activates the reader 12 to record an entrance event when the provider enters the bathroom. The system 10 comprises a dispenser trigger 20 disposed at each cleaning dispenser 22 having cleanser in the bathroom which activates the reader 12 to record a dispensing event when the provider causes the dispenser 22 to dispense cleanser. The reader having a display 24 which displays a number of dispensing events and a number of entrance events. Preferably, there can only be at most one dispensing event associated with one entrance event.

The present invention pertains to a method for allowing a person to monitor hand hygiene compliance. The method comprises the steps of activating a data reader 12 worn by the person by a portal trigger 14 disposed at each door portal 16 of a bathroom and recording an entrance event when the person enters the bathroom. There is the step of activating the reader 12 by a dispenser trigger 20 disposed at each cleaning dispenser 22 having cleanser in the bathroom and recording a dispensing event when the person causes the dispenser 22 to dispense cleanser. There is the step of displaying a number of dispensing events and a number of entrance events on a display 24 of the reader 12.

Restaurant employee approaches doorway to bathroom. He is wearing a system 10 which has an embedded Reader 12. The Reader's predominant feature will be called Lock A which behaves as a CPU 34 has the capacity to transmit and receive signals. Upon entering the bathroom (crossing the doorway threshold) a trigger or signal is generated. This is a uniquely generated signal or "Key" which is received by the Reader 12 or Key A. Hence, employee James enters the bathroom causing an electronic signal or Key to be generated upon crossing the doorway threshold which is received by the Reader 12 and thereby places Lock A in the enabled position. Once this occurs, the Reader 12 signals to Lock B embedded within the soap dispenser adjacent to the sink or any soap dispenser in the bathroom. Lock B enters into the enabled position. The unique electronic signal or Key assigned to employee James upon entry into the bathroom is maintained in the Reader 12 he is wearing and a signal is sent from this Reader 12 to Lock B which, as mentioned above, placed Lock B in the enabled position, but moreover forwards the unique electronic signal to Lock B. Once employee James washes his hands at the sink and dispenses soap, the action of dispensing the lever 28 advances the circuit. The dispenser sends out a quick survey signal to the user in immediate proximity (within 2 ft.) and identifies the unique Key or electronic signal within his Lock A. Lock B then checks for a matching code that is holding Lock B in the enabled position. Once this match occurs, a signal is sent from Lock B to Lock A on employee James causing his Lock A to move to the activated position. Lock A then automatically advances to finalized position after a predetermined time period or upon leaving the bathroom and crossing the doorway threshold. The unique Key signal generated upon entering the bathroom allows multiple persons to enter and use the bathroom and have their activities recorded in the system 10, regardless of the activities of other employees.

The system 10 in the above scenario after employee James enters, uses facilities, washes hands, and leaves would record 1 entry, 1 washing, Ratio 1:1.

If employee James enters the bathroom as noted above, (receiving an electronic signal or Key thereby placing Lock A on his Reader 12 into enabled position), uses the facilities but does not wash his hands and leaves the bathroom . . . Lock B which is within the soap dispenser mechanism (having been advanced to the enabled position with unique electronic signal Key for each employee who has entered the bathroom) automatically times out within a set period of time. Once this occurs the system 10 would record 1 entry, 0 washing, Ratio 1:0.

Figure 4:
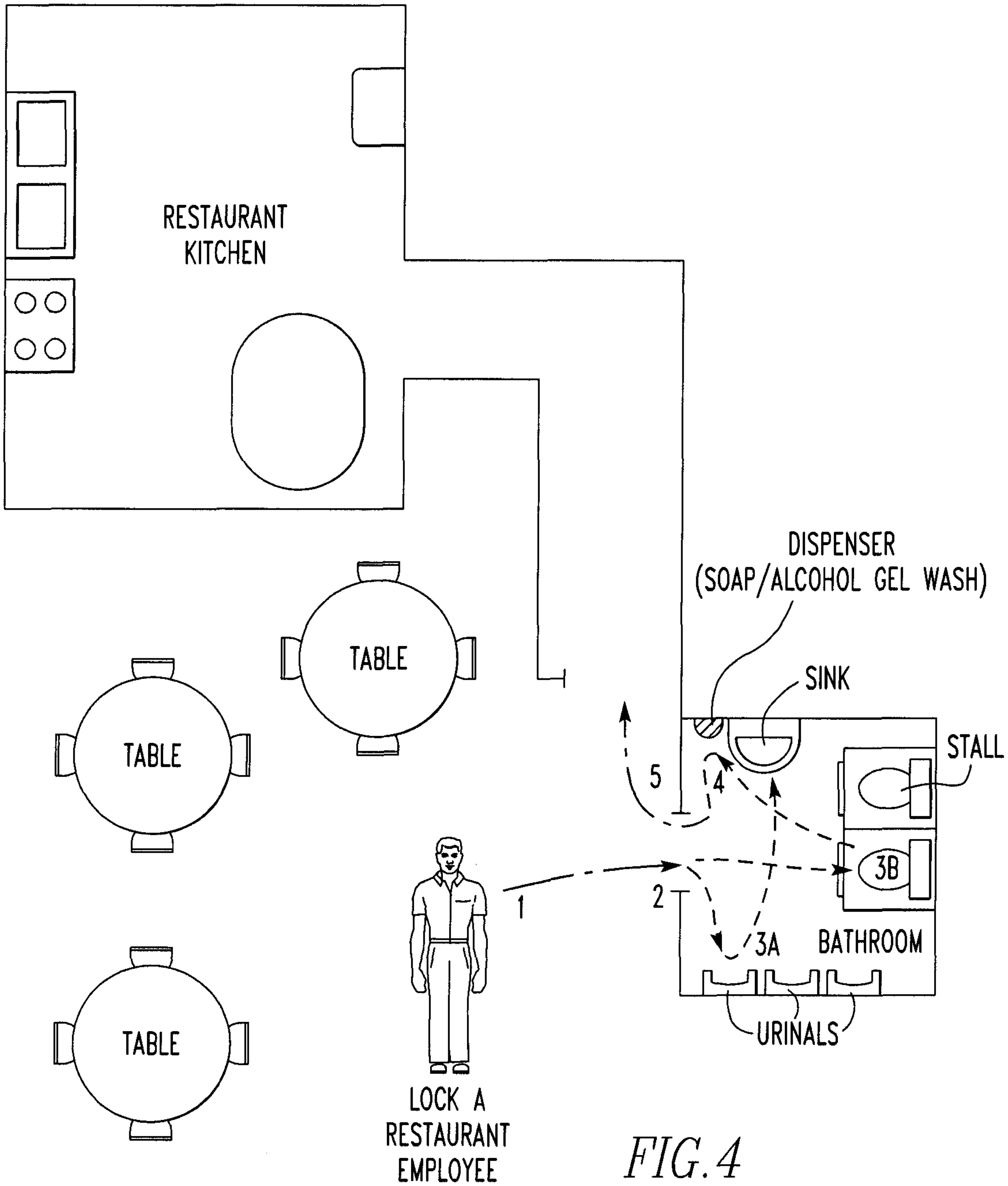
FIG. 4 is a schematic diagram of the system as applied to bathrooms.

In regard to FIG. 4:

1. Approach entrance to bathroom

2. Cross Doorway Threshold

Lock A enters into "Enabled" position

3a./3b. Use of facilities

4. Washes hands

Dispensing action places Lock A into "activated position.

5. Exit bathroom

Lock A placed into "finalized" position

The system 10 registers 1 Entry, 1 Wash, Ratio 1:1.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system which allows healthcare providers to monitor hand hygiene compliance comprising:

a data reader adapted to be worn by a healthcare provider;

a portal trigger disposed at each door portal of a patient room which activates the reader to record an entrance event when the provider enters the patient room; and a dispenser trigger disposed at each cleaning dispenser having cleanser in or at the entrance of each patient room which activates the reader to record a dispensing event when the provider causes the dispenser to dispense cleanser, the reader having a display which displays a number of dispensing events and a number of entrance events.

2. A system as described in claim 1 wherein the display displays a ratio of the number of dispensing events and the number of entrance events.

3. A system as described in claim 2 wherein the display displays the ratio, the number of entrance events, and the number of dispensing events simultaneously.

4. A system as described in claim 3 wherein the reader includes a lock which is controlled by the provider to control access to the number of dispensing events, the number of entrance events and the ratio recorded by the reader.

5. A system as described in claim 4 wherein the dispenser includes a lever to which the dispenser trigger is engaged.

6. A system as described in claim 5 wherein the reader resets the number of dispensing events, the number of entrance events and the ratio to zero after a predetermined time.

7. A system as described in claim 6 wherein the reader includes a memory which stores the number of dispensing events, the number of entrance events and the ratio.

8. A system as described in claim 7 wherein the reader includes a timer.

9. A system as described in claim 8 wherein the reader includes a CPU.

10. A system as described in claim 9 wherein the reader is part of a tag or a pager.

11. A system as described in claim 10 wherein the triggers have a transmitter and a receiver.

12. A system as described in claim 11 wherein the reader has a transmitter and a receiver.

13. A system as described in claim 12 wherein the memory can be externally electronically interrogated.

14. A system as described in claim 13 wherein an entrance event only occurs when the reader enters the patient room.

15. A system as described in claim 14 wherein there can only be at most two dispensing events associated with one entrance event.

16. A system as described in claim 15 wherein the reader has an enabled state entered when either an entrance event or a dispensing event occurs, an activated state entered when the reader is in the enabled state and an entrance event or a dispensing event occurs, and a finalized state entered when the reader is in an activated state and a dispensing event occurs.

17. A system as described in claim 16 wherein the dispenser trigger has an enabled position and an activated position; the enabled position on the dispenser trigger is entered into as a result of, and dependent upon, the reader entering the enabled state; the activated position on the dispenser trigger is subsequently arrived at when a dispensing event occurs with the dispenser.

18. A system as described in claim 17 including an additional data reader worn by an additional healthcare provider and wherein each reader only records a dispensing event associated with the provider having the corresponding reader.

19. A system as described in claim 18 wherein the dispenser transmits a key each time the dispenser has a dispensing event associated with the reader of the provider initiating the dispensing event.

20. A system as described in claim 17 wherein the reader and the triggers use RFID to communicate with each other.

21. A system as described in claim 17 wherein the reader and the triggers use Bluetooth technology to communicate with each other.

22. A method for allowing healthcare providers to monitor hand hygiene compliance comprising the steps of:

activating a data reader worn by a healthcare provider by a portal trigger disposed at each door portal of a patient room and recording an entrance event when the provider enters the patient room;

activating the reader by a dispenser trigger disposed at each cleaning dispenser having cleanser at the entrance of each patient room and recording a dispensing event when the provider causes the dispenser to dispense cleanser; and displaying a number of dispensing events and a number of entrance events on a display of the reader.

23. A method as described in claim 22 wherein the displaying step includes the step of displaying on the display a ratio of the number of dispensing events and the number of entrance events.

24. A method as described in claim 23 wherein the displaying step includes the step of displaying the ratio, the number of entrance events, and the number of dispensing events simultaneously.

25. A method as described in claim 24 including the step of controlling a lock of the reader by the provider to control access to the number of dispensing events, the number of entrance events and the ratio recorded by the reader.

26. A method as described in claim 25 including the step of resetting the number of dispensing events, the number of entrance events and the ratio to zero after a predetermined time.

27. A method as described in claim 26 including the step of interrogating electronically the memory externally.

28. A method as described in claim 27 including the steps of entering the reader into an enabled state when either an entrance event or a dispensing event occurs, entering the reader into an activated state when the reader is in the enabled state and an entrance event or a dispensing event occurs, and entering the reader into a finalized state when the reader is in an activated state and a dispensing event occurs.

29. A method as described in claim 28 including the step of entering the dispenser trigger into an enabled position as a result of, and dependent upon, the reader entering the enabled state; and entering the dispenser trigger into the activated position when a dispensing event occurs with the dispenser.

30. A method as described in claim 29 including the step of transmitting by the dispenser trigger a key each time the dispenser has a dispensing event associated with the reader of the provider initiating dispensing event.

31. A system which allows a person to monitor hand hygiene compliance comprising:

a data reader adapted to be worn by the person;

a portal trigger disposed at each door portal of a bathroom which activates the reader to record an entrance event when the provider enters the bathroom; and a dispenser trigger disposed at each cleaning dispenser having cleanser in the bathroom which activates the reader to record a dispensing event when the provider causes the dispenser to dispense cleanser, the reader having a display which displays a number of dispensing events and a number of entrance events.

32. A system as described in claim 31 wherein there can only be at most one dispensing event associated with one entrance event.

33. A method for allowing a person to monitor hand hygiene compliance comprising the steps of:

activating a data reader worn by the person by a portal trigger disposed at each door portal of a bathroom and recording an entrance event when the person enters the bathroom;

activating the reader by a dispenser trigger disposed at each cleaning dispenser having cleanser in the bathroom and recording a dispensing event when the person causes the dispenser to dispense cleanser; and displaying a number of dispensing events and a number of entrance events on a display of the reader.

* * * * *